(12) United States Patent
Vincent et al.

(10) Patent No.: US 12,098,284 B2
(45) Date of Patent: Sep. 24, 2024

(54) BITUMEN GRANULES WHICH ARE SOLID AT AMBIENT TEMPERATURE

(71) Applicant: TOTAL MARKETING SERVICES, Puteaux (FR)

(72) Inventors: Régis Vincent, Grigny (FR); Romain Colliat, Ruy-Montceau (FR)

(73) Assignee: TOTAL MARKETING SERVICES, Puteaux (FR)

( * ) Notice: Subject to any disclaimer, the term of this patent is extended or adjusted under 35 U.S.C. 154(b) by 708 days.

(21) Appl. No.: 17/413,804

(22) PCT Filed: Dec. 9, 2019

(86) PCT No.: PCT/EP2019/084261
§ 371 (c)(1),
(2) Date: Jun. 14, 2021

(87) PCT Pub. No.: WO2020/120408
PCT Pub. Date: Jun. 18, 2020

(65) Prior Publication Data
US 2022/0017751 A1    Jan. 20, 2022

(30) Foreign Application Priority Data
Dec. 12, 2018 (FR) ..................................... 1872747

(51) Int. Cl.
| C08L 95/00 | (2006.01) |
| C08K 5/092 | (2006.01) |
| C08K 5/28 | (2006.01) |
| C09D 195/00 | (2006.01) |

(52) U.S. Cl.
CPC ............. *C08L 95/00* (2013.01); *C08K 5/092* (2013.01); *C08K 5/28* (2013.01); *C09D 195/00* (2013.01); *C08L 2555/60* (2013.01)

(58) Field of Classification Search
CPC ..... C08L 95/00; C08L 2555/60; C08K 5/092; C08K 5/28; C09D 195/00
See application file for complete search history.

(56) References Cited

U.S. PATENT DOCUMENTS

| 2010/0192804 A1* | 8/2010 | Lapalu ................... C08K 5/092 |
| | | 106/284.4 |
| 2017/0226320 A1* | 8/2017 | Mariotti .................. C08K 5/25 |
| 2019/0330472 A1 | 10/2019 | Mouazen | |

OTHER PUBLICATIONS

Feb. 7, 2020 Search Report issued in International Patent Application No. PCT/EP2019/084261.
Jun. 8, 2021 International Preliminary Report on Patentability issued in International Patent Application No. PCT/EP2019/084261.

* cited by examiner

Primary Examiner — Alexandra M Moore
(74) Attorney, Agent, or Firm — Oliff PLC

(57) ABSTRACT

Bitumen granules including at least: bitumen, a compound of general formula R1-(COOH)z (I), a compound of general formula R2-(NH)nCONH—X—(NHCO)p(NH)n-R3 (II), and a compound of general formula Ar1-R—Ar2 (III); and a method for producing the bitumen granules and to the use thereof as asphalt binder.

18 Claims, No Drawings

BITUMEN GRANULES WHICH ARE SOLID AT AMBIENT TEMPERATURE

TECHNICAL FIELD

The present invention relates to bitumen pellets which are solid at ambient temperature, notably at elevated ambient temperature. The present invention also relates to a method for manufacturing these pellets and also to the use thereof as road binder. The present invention lastly relates to a method for transporting and/or storing and/or handling a bitumen in which the bitumen is transported and/or stored and/or handled at ambient temperature, notably at elevated ambient temperature, in the form of bitumen pellets according to the invention.

PRIOR ART

Bitumen or bituminous binder is the main hydrocarbon binder used in the fields of road construction and civil engineering. In order to be able to be used as binder in these different applications, the bitumen has to exhibit certain physicochemical and mechanical properties. It must notably be sufficiently hard and have a good consistency at the use temperatures to avoid, for example, the formation of ruts caused by traffic. Bitumen must also be elastic in order to resist deformations imposed by the traffic and/or temperature changes, these phenomena leading to cracking of the bituminous mixes and/or to stripping of the surface aggregates. Lastly, bitumen must be sufficiently fluid at application temperatures which are as low as possible in order to enable, for example, good coating of the aggregates and laying of the bituminous mix on the road. The use of a bituminous binder thus requires the combination of hardness, consistency and even also the elasticity of the bitumen at use temperatures with a low viscosity at the working and application temperatures.

As bitumen alone is generally not elastic enough, polymers, which may optionally be crosslinked, are added to the bitumen. These crosslinked polymers provide bituminous compositions with markedly improved elastic properties. However, the crosslinking of the polymers is irreversible: once the crosslinking has been carried out, it is not possible to return to the initial state that existed before the crosslinking reaction. Crosslinked bituminous compositions thus have good elastic properties, but exhibit a very high viscosity. One of the drawbacks associated with this high viscosity is the need to heat the crosslinked bitumen to a working and application temperature greater than that of a non-crosslinked bitumen, which increases the energy costs and requires the use of additional protective measures for operators.

Depending on the applications targeted, it is necessary to find a good compromise between the mechanical properties, including the elasticity, the hardness, the consistency, the fluidity and the viscosity, in particular the hot viscosity of the binder.

Another problem in the use of bitumen is associated with its transportation, handling and storage. Generally, bitumen is stored and transported hot, in bulk, in tanker trucks or by boats at high temperatures of about 120° C. to 180° C. However, the storage and transport of hot bitumen presents certain drawbacks. The transportation of hot bitumen in liquid form is considered dangerous and it is highly restricted from a regulatory point of view. This mode of transportation does not present particular difficulties when the transportation equipment and infrastructures are in good condition. If this is not the case, it can become problematic: if the tanker truck is not sufficiently thermally insulated, the viscosity of the bitumen may increase during an excessively long trip. The delivery distances for hot bitumen in its fluid form are therefore limited. Moreover, maintaining bitumen at high temperatures in the tanks or in tanker trucks consumes energy. In addition, maintaining bitumen at high temperatures for a long period of time can affect the properties of the bitumen and thus change the final performance qualities of the bituminous mix.

In order to overcome the problems of transporting and storing hot bitumen, packagings allowing the transportation and storage of bitumens at ambient temperature have been developed. This mode of transportation of bitumen in packaging at ambient temperature represents only a minimal fraction of the amounts transported worldwide, but it corresponds to very real needs for geographic regions which are difficult and expensive to access using conventional transportation means.

EP1917309 teaches the preparation of a bitumen base having certain characteristics of a blown bitumen by addition of a blowing additive of formula $Ar_1$—R—$Ar_2$. This document is not concerned with the problems associated with the transportation and/or storage of the compositions it discloses.

U.S. Pat. No. 3,026,568 describes bitumen pellets covered with a powdery material such as calcium carbonate powder. However, this type of bitumen in pellet form does not prevent creep of the bitumen, notably at elevated ambient temperature.

Application WO 2008107551 describes a method for the reversible crosslinking of bituminous compositions, based on the use of organogelator additives. The thermoreversibly crosslinked bituminous compositions thus obtained are hard at the use temperatures and have a reduced viscosity at the application temperatures.

Application WO 2009/153324 describes bitumen pellets coated with a polymeric anti-agglomerating agent, in particular of polyethylene. The drawback of this coating is that it modifies the properties of the bitumen during the road application thereof.

Application WO 2016/016318 describes bitumen pellets comprising a chemical additive.

Application WO 2018/115729 discloses the preparation of binder pellets comprising at least one acidic compound of formula R—$(COOH)_z$ and at least one amide compound of formula R'—$(NH)_n$CONH—$(X)_m$—$(NHCO)_p(NH)_n$—R".

The bitumen pellets disclosed in these two documents allow the transportation and/or the storage and/or the handling of the bitumen at ambient temperature without the latter creeping, as well as the reduction of adhesion of the pellets and agglomeration among them.

None of these documents discloses compositions comprising the combination of more than two organogelator additives.

Continuing its work, the applicant has discovered, surprisingly, a novel bituminous composition which is solid at ambient temperature, is usable as road binder and which makes it possible to more effectively avoid and reduce the adhesion and agglomeration during transportation and/or storage and/or handling thereof, at elevated ambient temperature, over long periods, and the properties of which are preserved over time compared to the prior art pellets.

More specifically, the applicant has demonstrated that this novel bituminous composition, packaged in the form of pellets, makes it possible to more effectively resist creep under extreme transportation and/or storage and/or handling conditions, in particular under conditions of compression, notably due to storage, over very long periods.

SUMMARY OF THE INVENTION

The invention relates first of all to bitumen pellets comprising at least:
a) bitumen,
b) a compound of general formula (I):

$$R_1—(COOH)_z \quad (I)$$

in which $R_1$ represents a linear or branched hydrocarbon chain, comprising from 4 to 68 carbon atoms, and z is an integer ranging from 2 to 4,
c) a compound of general formula (II):

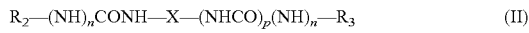

$$R_2—(NH)_n CONH—X—(NHCO)_p(NH)_n—R_3 \quad (II)$$

in which:
the $R_2$ and $R_3$ groups, which may be identical or different, represent a hydrocarbon chain comprising from 1 to 22 carbon atoms and optionally comprising heteroatoms such as N, O, S, and $R_3$ may be H,
the group X represents an optionally substituted hydrocarbon chain comprising from 1 to 22 carbon atoms and optionally comprising heteroatoms such as N, O, S,
n and p are integers having a value of 0 or 1 independently of one another,
d) a compound of general formula (III):

$$Ar1-R—Ar2 \quad (III)$$

in which:
Ar1 and Ar2 represent, independently of one another, an aromatic group comprising from 6 to 20 carbon atoms and chosen from a benzene ring or a system of fused aromatic rings, said aromatic group being substituted by at least one hydroxyl group and optionally by one or more $C_1$-$C_{20}$ alkyl groups, and
R represents an optionally substituted divalent hydrocarbon radical, the main chain of which comprises from 6 to 20 carbon atoms and at least one group chosen from amide, ester, hydrazide, urea, carbamate and anhydride functions.

Preferably, the compound of formula (I) is chosen from diacids of general formula (IA):

$$HOOC—C_wH_{2w}—COOH \quad (IA)$$

with w an integer ranging from 4 to 22, preferably from 4 to 12.

Preferably, the compound of general formula (II) is chosen from compounds of formula (IIA):

$$R_2—CONH—X—NHCO—R_3 \quad (IIA)$$

in which $R_2$, $R_3$ and X are as defined above.

Advantageously, the compound of general formula (III) is 2',3-bis[(3-[3,5-di-tert-butyl-4-hydroxyphenyl]propionyl)]propionohydrazide.

Preferably, the bitumen pellets according to the invention comprise from 0.1% to 10% by mass of one or more compounds of formula (I), more preferentially from 0.5% to 6% by mass, more preferentially from 0.5% to 5% by mass, and even more preferentially from 0.5% to 2.5% by mass, relative to the total mass of the pellets.

Preferably, the bitumen pellets according to the invention comprise from 0.1% to 10% by mass of one or more compounds of formula (II), more preferentially from 0.5% to 6% by mass, more preferentially from 0.5% to 5% by mass, and even more preferentially from 0.5% to 3.5% by mass, relative to the total mass of the pellets.

Preferably, the bitumen pellets according to the invention comprise from 0.1% to 10% by mass of one or more compounds of formula (III), more preferentially from 0.5% to 6% by mass, more preferentially from 0.5% to 5% by mass, and even more preferentially from 0.5% to 3% by mass, relative to the total mass of the pellets.

According to one embodiment, the bitumen pellets according to the invention are covered on at least a portion of their surface with an anti-agglomerating agent, preferably chosen from particulate anti-agglomerating agents, film-forming anti-agglomerating agents, and mixtures thereof.

The invention also relates to a method for manufacturing bitumen pellets as defined above and in detail below, comprising at least the following steps:
1) providing a bituminous composition comprising at least: bitumen, a compound of general formula (I), a compound of general formula (II) and a compound of formula (III),
2) forming said bituminous composition into the form of pellets, and
3) optionally, coating the pellets on all or part of their surface with at least one anti-agglomerating agent.

An object of the invention is also bitumen pellets capable of being obtained by implementing the method according to the invention.

The invention also relates to the use of bitumen pellets as defined above and in detail below as road binder.

The invention more particularly relates to the use of bitumen pellets as defined above and in detail below for the manufacture of bituminous mixes.

The invention also relates to a method for manufacturing bituminous mixes comprising at least one road binder and aggregates or recycled bituminous mix aggregates, the road binder being in the form of bitumen pellets as defined above or in detail below, this method comprising at least the steps of:

heating the aggregates to a temperature ranging from 100° C. to 180° C., preferably from 120° C. to 180° C., mixing the aggregates with the road binder in a vessel such as a mixer or a drum mixer, obtaining bituminous mixes.

Advantageously, the method for manufacturing bituminous mixes according to the invention does not comprise a step of heating the road binder before it is mixed with the aggregates.

The invention lastly relates to a method for transporting and/or storing and/or handling bitumen, said bitumen being transported and/or stored and/or handled at ambient temperature in the form of bitumen pellets as defined above or in detail below.

DETAILED DESCRIPTION

The expression "essentially composed of", followed by one or more characteristics, means that components or stages which do not significantly modify the properties and characteristics of the invention can be included in the method or the material of the invention, in addition to the components or stages explicitly listed.

The expression "between X and Y" includes the limits, unless explicitly mentioned otherwise. This expression therefore means that the target interval includes the values X, Y and all the values ranging from X to Y.

The present invention relates to bitumen pellets comprising at least:
a) bitumen,
b) a compound of general formula (I):

$$R_1—(COOH)_z \qquad (I)$$

in which $R_1$ represents a linear or branched, saturated or unsaturated, hydrocarbon chain comprising from 4 to 68 carbon atoms, and z is an integer ranging from 2 to 4,
c) a compound of general formula (II):

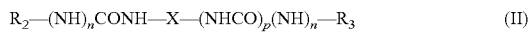

$$R_2—(NH)_nCONH—X—(NHCO)_p(NH)_n—R_3 \qquad (II)$$

in which:
the $R_2$ and $R_3$ groups, which may be identical or different, represent a saturated or unsaturated, linear, branched or cyclic, hydrocarbon chain comprising from 1 to 22 carbon atoms and optionally comprising heteroatoms such as N, O, S, $C_5$-$C_{24}$ hydrocarbon rings and/or $C_4$-$C_{24}$ hydrocarbon heterocycles comprising one or more heteroatoms such as N, O, S, and $R_3$ may be H,
the group X represents a saturated or unsaturated, linear, cyclic or branched, optionally substituted hydrocarbon chain comprising from 1 to 22 carbon atoms and optionally comprising heteroatoms such as N, O, S, $C_5$-$C_{24}$ hydrocarbon rings and/or $C_4$-$C_{24}$ hydrocarbon heterocycles comprising one or more heteroatoms such as N, S,
n and p are integers having a value of 0 or 1 independently of one another, and
d) a compound of general formula (III):

$$Ar1\text{-}R—Ar2 \qquad (III)$$

in which:
Ar1 and Ar2 represent, independently of one another, an aromatic group comprising from 6 to 20 carbon atoms and chosen from a benzene ring or a system of fused aromatic rings, said aromatic group being substituted by at least one hydroxyl group and optionally by one or more $C_1$-$C_{20}$ alkyl groups, and
R represents an optionally substituted divalent hydrocarbon radical, the main chain of which comprises from 6 to 20 carbon atoms and at least one group chosen from amide, ester, hydrazide, urea, carbamate and anhydride functions.

Preferentially, the bitumen pellets according to the invention essentially consist of:
a) bitumen,
b) one or more compounds of formula (I) as defined above and in detail below,
c) one or more compounds of formula (II) as defined above and in detail below, and
d) one or more compounds of formula (III) as defined above and in detail below.

More preferentially, the bitumen pellets according to the invention comprise, preferably essentially consist of:
a) from 70% to 99.7% by mass of bitumen,
b) from 0.1% to 10% by mass of one or more compounds of formula (I) as defined above and in detail below,
c) from 0.1% to 10% by mass of one or more compounds of formula (II) as defined above and in detail below, and
d) from 0.1% to 10% by mass of one or more compounds of formula (III) as defined above and in detail below,
relative to the total mass of the bitumen pellets according to the invention.

Advantageously, the bitumen pellets according to the invention comprise, preferably essentially consist of:
a) from 82% to 98.5% by mass of bitumen,
b) from 0.5% to 6% by mass of one or more compounds of formula (I) as defined above and in detail below,
c) from 0.5% to 6% by mass of one or more compounds of formula (II) as defined above and in detail below, and
d) from 0.5% to 6% by mass of one or more compounds of formula (III) as defined above and in detail below,
relative to the total mass of the bitumen pellets according to the invention.

More advantageously, the bitumen pellets according to the invention comprise, preferably essentially consist of:
a) from 85% to 98.5% by mass of bitumen,
b) from 0.5% to 5% by mass of one or more compounds of formula (I) as defined above and in detail below,
c) from 0.5% to 5% by mass of one or more compounds of formula (II) as defined above and in detail below, and
d) from 0.5% to 5% by mass of one or more compounds of formula (III) as defined above and in detail below,
relative to the total mass of the bitumen pellets according to the invention.

Even more advantageously, the bitumen pellets according to the invention comprise, preferably essentially consist of:
a) from 91% to 98.5% by mass of bitumen,
b) from 0.5% to 2.5% by mass of one or more compounds of formula (I) as defined above and in detail below,
c) from 0.5% to 3.5% by mass of one or more compounds of formula (II) as defined above and in detail below, and
d) from 0.5% to 3% by mass of one or more compounds of formula (III) as defined above and in detail below,
relative to the total mass of the bitumen pellets according to the invention.

Bitumen

The bitumen pellets according to the invention can contain bitumens obtained from different origins. Among the bitumens that can be used according to the invention, mention may be made first of all of bitumens of natural origin, those contained in natural bitumen or natural asphalt deposits or bituminous sands and bitumens originating from the refining of crude oil. The bitumens according to the invention are advantageously chosen from bitumens originating from the refining of crude oil or obtained from bituminous sands. The bitumens may be chosen from bitumens or mixtures of bitumens originating from the refining of crude oil, in particular bitumens containing asphaltenes or pitch. The bitumens can be obtained by conventional methods for manufacturing bitumens in refining, in particular by direct distillation and/or vacuum distillation of oil. These bitumens can optionally be visbroken and/or deasphalted and/or air-rectified. It is common practice to perform vacuum distillation of the atmospheric residues originating from the atmospheric distillation of crude oil. This manufacturing process consequently corresponds to the sequence of an atmospheric distillation and a vacuum distillation, the feedstock feeding the vacuum distillation corresponding to the atmospheric distillation residues. These vacuum residues obtained from the vacuum distillation tower can also be used as bitumens. It is also common practice to inject air into a feedstock usually composed of distillates and heavy products originating from the vacuum distillation of atmospheric residues originating from the distillation of oil. This process makes it possible to obtain a blown or semi-blown or oxidized or air-rectified or partially air-rectified base. The different bitumens or bitumen bases obtained by the refining processes can be combined with one another in order to obtain the best technical compromise. The bitumen may also be a recycled bitumen. The bitumens may be bitumens of hard grade or of soft grade.

Advantageously, the bitumen is chosen from bitumens of natural origin; bitumens obtained from bituminous sands; bitumens obtained from the refining of crude oil, such as atmospheric distillation residues, vacuum distillation residues, visbroken residues, blown residues and mixtures thereof; and combinations of these or from synthetic bitumens, also referred to as clear binders.

Preferably, the bitumen pellets according to the invention comprise from 70% to 99.7% by mass of bitumen, more preferentially from 82% to 98.5% by mass of bitumen, even more preferentially from 85% to 98.5% by mass of bitumen, and advantageously from 91% to 98.5% by mass of bitumen, relative to the total mass of the bitumen pellets according to the invention.

The Compound of Formula (I)

The bitumen pellets according to the invention comprise first of all at least one compound of general formula (I):

$$R_1\text{—}(COOH)_z \qquad (I)$$

in which $R_1$ represents a linear or branched, saturated or unsaturated, hydrocarbon chain comprising from 4 to 68 carbon atoms, preferably from 4 to 54 carbon atoms, more preferentially from 4 to 36 carbon atoms, and z is an integer ranging from 2 to 4.

Preferably, the $R_1$ group is a saturated linear chain of formula $C_wH_{2w}$, with w being an integer ranging from 4 to 22, preferably from 4 to 12.

The compounds of formula (I) may notably be diacids (z=2), triacids (z=3) or tetraacids (z=4). Preferably, the compound of formula (I) is chosen from diacids with z=2. Preferably, the diacids have the general formula HOOC—$C_wH_{2w}$—COOH, with w being an integer ranging from 4 to 22, preferably from 4 to 12 and where z=2 and $R_3=C_wH_{2w}$.

Advantageously, the compound of formula (I) is chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecanedioic acid with w=10 or tetradecanedioic acid with w=12. More advantageously, the compound of formula (I) is sebacic acid.

The diacids may also be diacid dimers of unsaturated fatty acid(s), i.e. dimers formed from at least one unsaturated fatty acid, for example from a single unsaturated fatty acid or from two different unsaturated fatty acids. The diacid dimers of unsaturated fatty acid(s) are conventionally obtained by intermolecular dimerization reaction of at least one unsaturated fatty acid (for example, Diels-Alder reaction). Preferably, a single type of unsaturated fatty acid is dimerized. They are derived in particular from the dimerization of an unsaturated, notably $C_8$ to $C_{34}$, notably $C_{12}$ to $C_{22}$, in particular $C_{18}$ to $C_{20}$, and more particularly $C_{18}$, fatty acid. A preferred fatty acid dimer is obtained by dimerization of linoleic acid, it being possible for this to be subsequently partially or totally hydrogenated. Another preferred fatty acid dimer has the formula HOOC—$(CH_2)_7$—CH=CH—$(CH_2)_7$—COOH. Another preferred fatty acid dimer is obtained by dimerization of methyl linoleate. In the same way, it is possible to have fatty acid triacids and fatty acid tetraacids, obtained respectively by trimerization and tetramerization of at least one fatty acid.

The content of compound of formula (I) in the bitumen pellets according to the invention ranges, preferably, from 0.1% to 10% by mass, more preferentially from 0.5% to 6% by mass, more preferentially from 0.5% to 5% by mass, and even more preferentially from 0.5% to 2.5% by mass, relative to the total mass of the bitumen pellets according to the invention.

The Compound of Formula (II)

The bitumen pellets according to the invention also comprise at least one compound of general formula (II):

$$R_2\text{—}(NH)_n\text{CONH—X—}(NHCO)_p(NH)_n\text{—}R_3 \qquad (II)$$

in which:

the $R_2$ and $R_3$ groups, which may be identical or different, represent a saturated or unsaturated, linear, branched or cyclic, hydrocarbon chain comprising from 1 to 22 carbon atoms and optionally comprising heteroatoms such as N, O, S, $C_5$-$C_{24}$ hydrocarbon rings and/or $C_4$-$C_{24}$ hydrocarbon heterocycles comprising one or more heteroatoms such as N, O, S, and $R_3$ may be H;

the group X represents a saturated or unsaturated, linear, cyclic or branched, optionally substituted hydrocarbon chain comprising from 1 to 22 carbon atoms and optionally comprising heteroatoms such as N, O, S, $C_5$-$C_{24}$ hydrocarbon rings and/or $C_4$-$C_{24}$ hydrocarbon heterocycles comprising one or more heteroatoms such as N, O, S;

n and p are integers having a value of 0 or 1 independently of one another.

Preferably, the $R_2$ and/or $R_3$ group comprises an aliphatic hydrocarbon chain having from 4 to 22 carbon atoms, notably chosen from $C_4H_9$, $C_5H_{11}$, $C_9H_{19}$, $C_{11}H_{23}$, $C_{12}H_{25}$, $C_{17}H_{35}$, $C_{18}H_{37}$, $C_{21}H_{43}$, and $C_{22}H_{45}$ groups.

Preferably, the X group represents a saturated, linear hydrocarbon chain comprising from 1 to 22 carbon atoms, advantageously from 1 to 12 carbon atoms and better still from 1 to 4 carbon atoms. More preferentially, the X group is chosen from $C_2H_4$ and $C_3H_6$ groups.

Preferably, the compound of general formula (II) is chosen from those satisfying the condition n=0.

Preferably, the compound of general formula (II) is chosen from those satisfying the following condition: the sum of the numbers of carbon atoms of $R_2$, X and $R_3$ is greater than or equal to 10, advantageously greater than or equal to 14, preferably greater than or equal to 18.

Preferably, the compound of general formula (II) is chosen from those satisfying the following condition: the number of carbon atoms of at least one of $R_2$ and $R_3$ is greater than or equal to 10, advantageously greater than or equal to 12, preferably greater than or equal to 14.

Preferably, the compound of general formula (II) is chosen from those of formula (IIA):

$$R_2\text{—CONH—X—NHCO—}R_3 \qquad (IIA)$$

in which $R_2$, $R_3$ and X are as defined above.

Preferably, in formula (IIA), the X group represents a saturated, linear hydrocarbon chain comprising from 1 to 22 carbon atoms, advantageously X represents a linear, saturated hydrocarbon chain comprising from 1 to 12 carbon atoms and better still from 1 to 4 carbon atoms. Preferably, the X group is chosen from $C_2H_4$ and $C_3H_6$ groups. More preferentially, the compound of general formula (IIA) is chosen from hydrazide derivatives such as the compounds $C_5H_{11}$—CONH—NHCO—$O_5H_{11}$, $C_9H_{19}$—CONH—NHCO—$C_9H_{19}$, $C_{11}H_{23}$—CONH—NHCO—$C_{11}H_{23}$, $C_{17}H_{35}$—CONH—NHCO—$C_{17}H_{35}$, or $C_{21}H_{43}$—CONH—NHCO—$C_{21}H_{43}$; diamides such as N,N'-ethylenedi(laurylamide) of formula $C_{11}H_{23}$—CONH—$CH_2$—$CH_2$—NHCO—$C_{11}H_{31}$, N,N'-ethylenedi(myristylamide) of formula $C_{13}H_{27}$—CONH—$CH_2$—$CH_2$—NHCO—$C_{13}H_{27}$, N,N'-ethylenedi(palmitamide) of formula $C_{15}H_{31}$—

CONH—CH$_2$—CH$_2$—NHCO—C$_{15}$H$_{31}$, N,N'-ethylenedi(stearamide) of formula C$_{17}$H$_{35}$—CONH—CH$_2$—CH$_2$—NHCO—C$_{17}$H$_{35}$; monoamides such as laurylamide of formula C$_{11}$H$_{23}$—CONH$_2$, myristylamide of formula C$_{13}$H$_{27}$—CONH$_2$, palmitamide of formula C$_{15}$H$_{31}$—CONH$_2$, stearamide of formula C$_{17}$H$_{35}$—CONH$_2$. Even more advantageously, the compound of general formula (IIA) is N,N'-ethylenedi(stearamide) of formula C$_{17}$H$_{35}$—CONH—CH$_2$—CH$_2$—NHCO—C$_{17}$H$_{35}$.

The content of compound of formula (II) in the bitumen pellets according to the invention ranges, preferably, from 0.1% to 10% by mass, more preferentially from 0.5% to 6% by mass, more preferentially from 0.5% to 5% by mass, and even more preferentially from 0.5% to 3.5% by mass, relative to the total mass of the bitumen pellets according to the invention.

The Compound of Formula (III)

The bitumen pellets according to the invention lastly comprise at least one compound of general formula (III):

Ar1-R—Ar2       (III)

in which:

Ar1 and Ar2 represent, independently of one another, an aromatic group comprising from 6 to 20 carbon atoms and chosen from a benzene ring or a system of fused aromatic rings, said aromatic group being substituted by at least one hydroxyl group and optionally by one or more C$_1$-C$_{20}$ alkyl groups, and R represents an optionally substituted divalent hydrocarbon radical, the main chain of which comprises from 6 to 20 carbon atoms and at least one group chosen from amide, ester, hydrazide, urea, carbamate and anhydride functions, preferably a hydrazide group.

Preferably, Ar1 and/or Ar2 are substituted by at least one alkyl group having 1 to 10 carbon atoms, advantageously in one or more ortho positions with respect to the hydroxyl group(s), more preferentially Ar1 and Ar2 are 3,5-dialkyl-4-hydroxyphenyl groups, advantageously 3,5-di-tert-butyl-4-hydroxyphenyl groups.

Preferably, R is in the para position with respect to a hydroxyl group of Ar1 and/or Ar2.

Advantageously, the compound of formula (III) is 2',3-bis[(3-[3,5-di-tert-butyl-4-hydroxyphenyl]propionyl)]propionohydrazide.

The content of compound of formula (III) in the bitumen pellets according to the invention ranges, preferably, from 0.1% to 10% by mass, more preferentially from 0.5% to 6% by mass, more preferentially from 0.5% to 5% by mass, and even more preferentially from 0.5% to 3% by mass, relative to the total mass of the bitumen pellets according to the invention.

The Bitumen Pellets According to the Invention

The bitumen pellets according to the invention may exhibit any divided form which makes it possible to promote the transportation and/or storage and/or use and/or handling of the bitumen.

The bitumen pellets according to the invention may exhibit, within a given population of pellets, one or more distinct divided forms. Preferably, the pellets according to the invention have a cylindrical, spherical, hemispherical, ovoid or tetrahedral form, notably in the form of berlingots.

According to one embodiment of the invention, the size of the pellets according to the invention is such that the longest average dimension is preferably less than or equal to 50 mm, more preferentially ranges from 3 to 30 mm, even more preferentially ranges from 5 to 20 mm. Preferably, when the bitumen pellets according to the invention have a spherical, hemispherical or ovoid form, the size of the pellets according to the invention is such that the longest average dimension ranges from 3 to 30 mm, even more preferentially from 5 to 20 mm. Preferably, when the bitumen pellets according to the invention have a tetrahedral form, the size of the pellets according to the invention is such that the longest average dimension ranges from 2 to 50 mm, even more preferentially from 5 to 50 mm. For example, the use of a die makes it possible to control the manufacture of pellets of a chosen size. Screening allows selection of the pellets according to their size.

Preferably, the pellets according to the invention have a weight ranging from 0.1 g to 50 g, preferably ranging from 0.2 g to 30 g, more preferentially ranging from 0.2 g to 20 g. Preferably, when the bitumen pellets according to the invention have a spherical, hemispherical or ovoid form, the pellets according to the invention have a weight ranging from 0.2 g to 10 g, more preferentially ranging from 0.2 g to 5 g. Preferably, when the bitumen pellets according to the invention have a tetrahedral form, the pellets according to the invention have a weight ranging from 0.1 g to 50 g, more preferentially ranging from 0.2 g to 50 g, even more preferentially from 0.2 to 20 g.

According to a particular embodiment, the bitumen pellets according to the invention are covered on at least a portion of their surface with an anti-agglomerating agent.

For the purposes of the invention, the term "anti-agglomerating agent" is understood to mean any compound which limits and/or reduces and/or inhibits and/or slows the agglomeration and/or adhesion between the pellets during the transportation and/or storage thereof at ambient temperature and which ensures the fluidity of same during the handling thereof.

Preferably, the anti-agglomerating agent is chosen from particulate anti-agglomerating agents, film-forming anti-agglomerating agents, and mixtures thereof.

Particulate Anti-Agglomerating Agents

According to a first variant, the anti-agglomerating agent is chosen from particulate anti-agglomerating agents, preferably of mineral or organic origin, more preferentially of mineral origin.

For the purposes of the invention, the term "particulate anti-agglomerating agent" is understood to mean an anti-agglomerating agent which at ambient temperature is in the form of divided particles, notably in the form of chips, flakes or else powder.

Preferably, the particulate anti-agglomerating agent is chosen from: talc; fines generally with a diameter of less than 125 µm, such as siliceous fines, with the exception of calcium carbonate fines; sand, such as Fontainebleau sand; cement; carbon; wood residues such as lignin, lignosulfonate, conifer needle powders and conifer cone powders, notably of pine; rice husk ash; glass powder; clays such as kaolin, bentonite, vermiculite; alumina such as alumina hydrates; silica; silica derivatives such as silica fume, functionalized silica fume, notably hydrophobic or hydrophilic silica fume, fumed silicas, notably hydrophobic or hydrophilic fumed silicas, silicates, silicon hydroxides and silicon oxides; plastics powder; lime; hydrated lime; plaster; rubber crumb; polymer powder, using polymers such as styrene-butadiene copolymers (SB), styrene-butadiene-styrene copolymers (SBS); and mixtures of these materials.

Advantageously, the particulate anti-agglomerating agent is chosen from talc; fines generally with a diameter of less than 125 µm with the exception of calcium carbonate fines, such as siliceous fines; wood residues such as lignin, lignosulfonate, conifer needle powders and conifer cone powders, notably of pine; glass powder; sand, such as Fontainebleau sand; silica fume, notably hydrophobic or hydrophilic silica fume, fumed silicas, notably hydrophobic or hydrophilic fumed silicas; and mixtures thereof.

Film-Forming Anti-Agglomerating Agents

According to a second variant, the anti-agglomerating agent is chosen from film-forming anti-agglomerating agents.

For the purposes of the invention, the term "film-forming agent", is understood to mean a compound capable of forming a—preferably continuous—film, envelope or else a skin, on the surface of an object upon which it has been applied/deposited.

Preferably, the film-forming anti-agglomerating agent is chosen from hot-melt anti-agglomerating agents, gel-type anti-agglomerating agents, and mixtures thereof.

For the purposes of the invention, the term "hot-melt material" is understood to mean a material capable of softening under the effect of heat.

When the anti-agglomerating agent is chosen from hot-melt anti-agglomerating agents, it is, preferably, chosen from polypropylene, polyethylene and mixtures of polyethylene and polypropylene.

The bitumen pellets coated with a hot-melt anti-agglomerating agent have the advantage of being ready to use, that is to say that they may be heated directly in the melter or optionally introduced directly into the mixing unit for manufacturing bituminous road mixes, without being unwrapped beforehand. The hot-melt anti-agglomerating agent which melts with the bituminous core of the pellets according to the invention does not affect the properties thereof.

For the purposes of the invention, the term "gel-type anti-agglomerating agent" is understood to mean a compound capable of increasing the viscosity of a liquid or of a composition so as to form a gel film.

Preferably, the gel-type anti-agglomerating agent has a dynamic viscosity of greater than or equal to 50 mPa·s, preferably of from 50 mPa·s to 550 mPa·s, more preferentially of from 80 mPa·s to 450 mPa·s, the viscosity being a Brookfield viscosity measured at 65° C. The viscosity of the gel-type anti-agglomerating agent is measured at 65° C. by means of a Brookfield CAP 2000+ viscometer at a rotational speed of 750 rpm. The measurement is read after 30 seconds for each temperature.

Preferably, the gel-type anti-agglomerating agent is chosen from:
  cellulose derivatives, preferably cellulose ethers,
  gelling compounds, preferably of plant or animal origin, such as: gelatin, agar-agar, alginates, starches, modified starches or gellan gums;
  polyethylene glycols (PEGs) such as PEGs having a molecular weight of between 800 g·mol$^{-1}$ and 8000 g·mol$^{-1}$, for instance a PEG having a molecular weight of 800 g·mol$^{-1}$ (PEG-800), a PEG having a molecular weight of 1000 g·mol$^{-1}$ (PEG-1000), a PEG having a molecular weight of 1500 g·mol$^{-1}$ (PEG-1500), a PEG having a molecular weight of 4000 g·mol$^{-1}$ (PEG-4000) or a PEG having a molecular weight of 6000 g·mol$^{-1}$ (PEG-6000);
  mixtures of such compounds.

More preferably, the gel-type anti-agglomerating agent is chosen from:
  cellulose derivatives, preferably cellulose ethers,
  gelling compounds, preferably of plant or animal origin, such as gelatin, agar-agar, alginates, and gellan gums;
  polyethylene glycols (PEGs) such as PEGs having a molecular weight of between 800 g·mol$^{-1}$ and 8000 g·mol$^{-1}$, for instance a PEG having a molecular weight of 800 g·mol$^{-1}$ (PEG-800), a PEG having a molecular weight of 1000 g·mol$^{-1}$ (PEG-1000), a PEG having a molecular weight of 1500 g·mol$^{-1}$ (PEG-1500), a PEG having a molecular weight of 4000 g·mol$^{-1}$ (PEG-4000) or a PEG having a molecular weight of 6000 g·mol$^{-1}$ (PEG-6000);
  mixtures of such compounds.

Advantageously, the gel-type anti-agglomerating agent is chosen from cellulose ethers.

Preferably, according to this embodiment, the anti-agglomerating agent(s) cover at least 50% of the surface of the pellets, preferably at least 60%, preferentially at least 70%, more preferentially at least 80%, and even more preferentially at least 90%.

Advantageously, the amount of anti-agglomerating agent(s) covering at least a portion of the surface of the pellets is between 0.2% and 10% by mass, preferably between 0.5% and 8% by mass, more preferentially between 0.5% and 5% by mass, relative to the total mass of the pellets.

Also preferably, the average thickness of the layer of anti-agglomerating agent(s) is greater than or equal to 20 μm, more preferentially ranges from 20 to 1 mm and more preferentially is of the order of 20 to 100 μm.

Method for Manufacturing Bitumen Pellets According to the Invention

The present invention also relates to a method for manufacturing bitumen pellets as defined above, this method comprising at least the following steps:
  1) providing a bituminous composition comprising at least: bitumen, a compound of general formula (I), a compound of general formula (II) and a compound of general formula (III),
  2) forming the composition obtained in 1) into the form of pellets, and
  3) optionally, coating the pellets on all or part of their surface with at least one anti-agglomerating agent.

The bitumen employed in the method above may be used in pure or additivated form, preferably in anhydrous form or else in combination with aggregates in the form of a bituminous mix.

Step 2) of forming the bituminous composition is carried out by any known method. As suitable method, mention may notably be made of the manufacturing method described in document U.S. Pat. No. 3,026,568, document WO 2009/153324, document WO 2012/168380 or else document WO 2018/104660.

According to one particular embodiment, the forming of the pellets is carried out by draining, in particular using a drum. Other techniques may be used in the method for manufacturing pellets, in particular molding, extrusion, co-extrusion, etc.

According to one embodiment, the method for manufacturing bitumen pellets according to the invention comprises, before step 1), a prior step of bringing the bitumen and the compounds of formulae (I), (II) and (III) into contact, the contacting being performed at a temperature ranging from 70° C. to 220° C.

Advantageously, according to this embodiment, the method defined above comprises, before step 1), the following steps:
  (i) introducing a bitumen into a container equipped with mixing means and heating the bitumen to a temperature ranging from 70° C. to 220° C., preferably ranging from 90° C. to 180° C., even more preferentially ranging from 110° C. to 180° C.,
  (ii) simultaneously or successively introducing the compounds of formulae (I), (II) and (III), and (iii) mixing the bituminous composition at a temperature ranging from 70° C. to 220° C., preferably ranging from 90° C. to 180° C., even more preferentially ranging from 110° C. to 180° C., preferably until a homogeneous composition is obtained. The compounds of formulae (I), (II) and (III) may be brought into contact with the bitumen simultaneously, by direct addition of the compounds of formulae (I), (II) and (III) into the bitumen, or else by successive addition of the different compounds of formulae (I), (II) and (III). Preferably the compounds of formulae (I), (II) and (III) are brought into contact with the bitumen at a temperature ranging from 90° C. to 180° C., more preferentially ranging from 110° C. to 180° C.

Step 3) of coating the pellets may be carried out by any known method. The coating may for example be carried out by dipping the bitumen pellets obtained at the end of step 2) into a coating composition comprising one or more anti-agglomerating agents, followed by a step of drying. Coating step 3) may also be carried out by means of a fluidized-bed process, as described for example in U.S. Pat. No. 5,236,503 or in EP 1 407 814.

Method for Transporting and/or Storing and/or Handling

The invention also relates to a method for transporting and/or storing and/or handling a bituminous composition, said bituminous composition being transported and/or stored and/or handled at ambient temperature, notably at elevated ambient temperature, in the form of bitumen pellets as defined above.

Preferably, the bituminous composition is transported and/or stored at an ambient temperature, notably at an elevated ambient temperature, for a duration of greater than or equal to 2 months, preferably greater than or equal to 3 months. Ambient temperature is understood to mean the use temperature of the bituminous composition, it being understood that ambient temperature does not involve any provision of heat other than that resulting from the climatic conditions. Thus, the ambient temperature may reach high values, less than 100° C. during summer periods, in particular in geographical regions with a hot climate. Preferably, the ambient temperature is less than 100° C. Advantageously, the ambient temperature is from 20° C. to 50° C., preferably from 25° C. to 50° C., preferably from 25° C. to 40° C. Advantageously, the elevated ambient temperature is from 40° C. to 90° C., preferably from 50° C. to 85° C., even more preferentially from 50° C. to 75° C., and even more preferentially from 50° C. to 70° C.

The bitumen pellets according to the invention are notable for being easy to handle, even at elevated ambient temperatures. The bitumen pellets according to the invention enable in particular the transportation and/or the storage of the bituminous composition of which they are composed under optimal conditions, in particular without the appearance of creep phenomena during the transportation and/or the storage thereof, even when the ambient temperature is elevated, and without degradation of the properties of said bituminous composition, indeed even with improvement thereof.

Use of the Bituminous Compositions According to the Invention

Various uses of the bitumen pellets according to the invention are envisaged, notably for the preparation of a, preferably anhydrous, bituminous binder.

The present invention relates in particular to the use of the bitumen pellets according to the invention as a road binder. Preferably, the bitumen pellets according to the invention are used, optionally in a mixture with aggregates or recycled bituminous mix aggregates, to manufacture a surface coating, a hot bituminous mix, a base course, a binder course, a tack course or a surface course.

These applications are targeted in particular at bituminous mixes as materials for the construction and the maintenance of road foundations and their surfacing, and also in carrying out all road works. Mention may be made of other examples of combinations of a bituminous composition and of aggregates having particular properties, such as anti-rutting layers, bituminous draining mixes or asphalts (mixture of a bituminous binder and sand-type aggregates).

The invention relates in particular to a method for manufacturing bituminous mixes comprising at least one road binder and aggregates or recycled bituminous mix aggregates, the bituminous binder being in the form of bitumen pellets as defined above.

Preferably, the method for manufacturing bituminous mixes according to the invention comprises at least the following steps:

heating the aggregates to a temperature ranging from 100° C. to 180° C., preferably from 120° C. to 180° C., mixing the aggregates with the road binder in a vessel such as a mixer or a drum mixer, notably in solid and divided form, obtaining bituminous mixes.

The method for manufacturing bituminous mixes according to the invention advantageously does not require a step of heating the road binder before mixing with the recycled bituminous mix aggregates or the aggregates since, on contact with the hot mixture of aggregates, the road binder in the form of pellets according to the invention melts.

A further subject of the invention is a method for preparing a surface coating, a hot bituminous mix, or a warm bituminous mix, said binder being combined with recycled milled products and/or aggregates, this method comprising the use of bitumen pellets as defined above.

The various embodiments, variants, preferences and advantages described above for each of the subjects of the invention apply to all the subjects of the invention and can be taken separately or in combination.

The invention is illustrated by the following examples, given without implied limitation.

EXAMPLES

In these examples, the parts and percentages are expressed by weight, unless otherwise indicated.

Materials and Methods

The rheological and mechanical characteristics of the bitumen and of the bituminous compositions to which reference is made in these examples are measured according to the methods indicated in table 1.

TABLE 1

| Property | Abbreviation | Unit | Measurement standard |
|---|---|---|---|
| Needle penetrability at 25° C. | $P_{25}$ | 1/10 mm | NF EN 1426 |
| Ring-and-ball softening temperature | RBT | ° C. | NF EN 1427 |
| Maximum force | $F_{max}$ | N | See protocol below |

Bitumen Base:

A bitumen base of 35/50 grade, denoted B0, having a penetrability P25 of 44 1/10 mm and an RBT of 51.6° C. and commercially available from Total Marketing Services, is selected.

Additives:
- Additive A1 of formula (I): sebacic acid,
- Additive A2 of formula (II): N,N'-ethylenedi(stearamide) sold by Croda under the name Crodawax 140 ®, and
- Additive A3 of formula (III): 2',3-bis[(3-[3,5-di-tert-butyl-4-hydroxyphenyl]propionyl)]propionohydrazide (CAS 32687-78-8) sold by BASF under the brand Irganox MD 1024®.

Method for Preparing the Bituminous Compositions:

The bitumen base ($B_0$) is introduced into a reactor maintained at 160° C. with stirring at 300 revolutions/min for two hours. The various additives are then introduced into the reactor. The contents of the reactor are maintained at 160° C. with stirring at 300 revolutions/min for 1 hour.

Method for Preparing Bitumen Pellets

I—Preparation of the Cores of the Pellets a) General Method for Preparing the Cores of Binder of the Pellets The bituminous composition prepared above is heated again to 160° C. for two hours in an oven before being poured into a silicone mold having various spherical mold cavities so as to form solid binder cores. After 30 minutes, the solid binder in the form of uncoated pellets is removed from the mold and stored in a tray covered with silicone paper. The binder cores are left to cool to ambient temperature for 10 to 15 minutes.

b) General Method for Preparing the Bitumen Cores of the Pellets According to the Invention with an Industrial Process For implementation of this method, it is possible to use a device and a process as described in great detail in the U.S. Pat. No. 4,279,579. Various models of this device are commercially available from the company Sandvik under the trade name Rotoform®.

The bituminous composition prepared above is poured into the tank of such a device and is maintained at a temperature of between 130 and 160° C. One or more injection nozzles enable transfer of the bitumen composition according to the invention to the interior of the pelletizing twin drum comprising an external rotating drum, the two drums being equipped with slits, nozzles and orifices allowing the pelletizing of drops of bitumen through the first stationary drum and the orifices between 2 and 8 mm in diameter of the external rotating drum. The bitumen drops are deposited on the upper face of a horizontal conveyor belt driven by rollers.

II—Coating of the Pellet Cores

The cores of bitumen obtained in I—are poured into a coating composition. They are then stirred manually into the solution for a few minutes and are then removed in order to be placed on a plate and left to dry at ambient temperature (approximately 30° C.).

Pellets of solid bitumen with a core/shell structure are thus obtained.

Protocol for Measuring the Maximum Force $F_{max}$)

This test is carried out in order to evaluate the compressive strength of a bituminous composition subjected to an imposed load at a constant speed and at a temperature of 50° C.

The maximum force ($F_{max}$) is measured using a texture analyzer sold under the name LF Plus by the company Lloyd Instruments and equipped with a thermal chamber. To do this, a cylindrical metallic box containing a 60 g mass of the bituminous composition to be analyzed is placed inside the thermal chamber regulated to a temperature of 50° C. The piston of the texture analyzer is a cylinder with a diameter equal to 25 mm and a height of 60 mm. The cylindrical piston is at the start placed in contact with the upper surface of the bituminous composition. It then moves vertically downward, at a constant speed of 1 mm/min, over a calibrated distance of 10 mm, so as to exert a compressive force on the upper surface of the bituminous composition. The texture analyzer measures the maximum compressive force applied by the piston on the bituminous composition at 50° C.

The measurement of the maximum compressive force enables an evaluation of the capacity of the bituminous composition to resist deformation. The greater the value for the maximum force, the better will be the deformation resistance of bitumen pellets prepared from this bituminous composition.

Results

1. Preparation of the Various Compositions

The compositions $C_1$ to $C_8$, corresponding to the mixtures detailed in table 2, are prepared according to the protocol I—b) described above.

Compositions $C_1$ to $C_6$ are comparative.

Compositions $C_7$ and $C_8$ are according to the invention.

TABLE 2

|  | 1 additive | | | 2 additives | | | 3 additives | |
| --- | --- | --- | --- | --- | --- | --- | --- | --- |
|  | $C_1$ | $C_2$ | $C_3$ | $C_4$ | $C_5$ | $C_6$ | $C_7$ | $C_8$ |
| $B_0$ (%) | 98.5 | 97.5 | 99.25 | 96.0 | 95.3 | 95.3 | 96.2 | 96.0 |
| $A_1$ (%) | 1.5 | — | — | 1.5 | — | 4.0 | 1.2 | 1.5 |
| $A_2$ (%) | — | 2.5 | — | 2.5 | 4.0 | 0 | 2.0 | 1.6 |
| $A_3$ (%) | — | — | 0.75 | 0 | 0.7 | 0.7 | 0.6 | 1.9 |
| $A_1 + A_2 + A_3$ (%) | 1.5 | 2.5 | 0.75 | 4 | 4.7 | 4.7 | 3.8 | 5 |

2. Rheological and Mechanical Properties of the Compositions $C_1$ to $C_8$

The penetrability at 25° C., the ring-and-ball softening temperature and the maximum force of the compositions $C_1$ to $C_8$ prepared above were measured according to the protocols defined above.

The results of these measurements are given in table 3 below.

TABLE 3

|  | $B_0$ | $C_1$ | $C_2$ | $C_3$ | $C_4$ | $C_5$ | $C_6$ | $C_7$ | $C_8$ |
| --- | --- | --- | --- | --- | --- | --- | --- | --- | --- |
| P25 (1/10 mm) | 44 | 26 | 35 | 35 | 20 | 28 | 23 | 20 | 17 |
| RBT (° C.) | 51.6 | 106.5 | 86.5 | 102.0 | 106.0 | 103.5 | 99.5 | 105.5 | 96.5 |
| $F_{max}$ (N) | 0.9 | 23.6 | 2.98 | 75 | 83 | 78.9 | 85.7 | 192 | 310 |

Penetrability at 25° C. ($P_{25}$)

The compositions $C_7$ and $C_8$ according to the invention have reduced penetrability values compared to those of compositions $C_1$ to $C_3$ comprising a single additive $A_1$, $A_2$ or $A_3$.

The compositions $C_7$ and $C_8$ according to the invention have similar or reduced penetrability values compared to those of compositions $C_4$ to $C_6$ comprising the combination of two additives $A_1$ and/or $A_2$ and/or $A_3$.

The bituminous compositions according to the invention thus have a similar or reduced penetrability, compared to those of compositions comprising only one or two additives chosen from $A_1$, $A_2$ and $A_3$.

Ring-and-Ball Softening Temperature (RBT)

The compositions $C_1$ to $C_8$ have a similar ring-and-ball softening temperature.

Maximum Force ($F_{max}$)

Among the compositions $C_1$ to $C_6$, the highest value for maximum force is achieved by composition $C_6$, with 85.7 N.

Composition $C_7$ according to the invention exhibits a maximum force equal to 192 N, i.e. more than 2 times greater than that of composition $C_6$.

Composition $C_8$ according to the invention exhibits a maximum force equal to 310 N, i.e. more than 3.5 times greater than that of composition $C_6$.

The compositions according to the invention therefore exhibit a maximum force which is markedly greater than that of compositions $C_1$ to $C_6$.

The high maximum force of the compositions according to the invention is evidence of an improved deformation resistance of the compositions according to the invention compared to the prior art compositions $C_1$ to $C_6$.

Formed into pellets, the compositions $C_7$ and $C_8$ according to the invention are storage-stable and notably have an improved creep strength compared to pellets obtained from compositions $C_1$ to $C_6$.

The invention claimed is:

1. Bitumen pellets comprising at least:
    a) bitumen,
    b) a compound of general formula (I):

$$R_1\text{—}(COOH)_z \qquad (I)$$

in which $R_1$ represents a linear or branched hydrocarbon chain comprising from 4 to 68 carbon atoms, and z is an integer ranging from 2 to 4,
    c) a compound of general formula (II):

$$R_2\text{—}(NH)_n CONH\text{—}X\text{—}(NHCO)_p(NH)_n\text{—}R_3 \qquad (II)$$

in which:
        the $R_2$ and $R_3$ groups, which may be identical or different, represent a hydrocarbon chain comprising from 1 to 22 carbon atoms and optionally comprising heteroatoms, and $R_3$ may be H,
        the group X represents an optionally substituted hydrocarbon chain comprising from 1 to 22 carbon atoms and optionally comprising heteroatoms,
        n and p are integers having a value of 0 or 1 independently of one another, and
    d) a compound of general formula (II):

$$Ar1\text{-}R\text{—}Ar2 \qquad (III)$$

in which:
        Ar1 and Ar2 represent, independently of one another, an aromatic group comprising from 6 to 20 carbon atoms and chosen from a benzene ring or a system of fused aromatic rings, the aromatic group being substituted by at least one hydroxyl group and optionally by one or more $C_1$-$C_{20}$ alkyl groups, and
        R represents an optionally substituted divalent hydrocarbon radical, the main chain of which comprises from 6 to 20 carbon atoms and at least one group chosen from amide, ester, hydrazide, urea, carbamate and anhydride functions.

2. The bitumen pellets as claimed in claim 1, wherein the compound of formula (I) is chosen from diacids of general formula (IA):

$$HOOC\text{—}C_w H_{2w}\text{—}COOH \qquad (IA)$$

with w an integer ranging from 4 to 22.

3. The bitumen pellets as claimed in claim 2, wherein the compound of formula (IA) is sebacic acid.

4. The bitumen pellets as claimed in claim 1, wherein the compound of general formula (II) is chosen from compounds of formula (IIA):

$$R_2\text{—}CONH\text{—}X\text{—}NHCO\text{—}R_3 \qquad (IIA)$$

in which $R_2$, $R_3$ and X are as defined in claim 1.

5. The bitumen pellets as claimed in claim 4, wherein the compound of general formula (IIA) is N,N'-ethylenedi(stearamide).

6. The pellet as claimed in claim 1, in which the compound of general formula (III) is 2',3-bis[(3-[3,5-di-tert-butyl-4-hydroxyphenyl]propionyl)]propionohydrazide.

7. The bitumen pellets as claimed in claim 1, comprising from 0.1% to 10% by mass of one or more compounds of formula (I), relative to the total mass of the pellets.

8. The bitumen pellets as claimed in claim 1, comprising from 0.1% to 10% by mass of one or more compounds of formula (II), relative to the total mass of the pellets.

9. The bitumen pellets as claimed in claim 1, comprising from 0.1% to 10% by mass of one or more compounds of formula (III), relative to the total mass of the pellets.

10. The bitumen pellets as claimed in claim 1, which comprise:
    a) from 70% to 99.7% by mass of bitumen,
    b) from 0.1% to 10% by mass of one or more compounds of formula (I),
    c) from 0.1% to 10% by mass of one or more compounds of formula (II), and
    d) from 0.1% to 10% by mass of one or more compounds of formula (III),
    relative to the total mass of the bitumen pellets.

11. The bitumen pellets as claimed in claim 10, which comprise:
    a) from 82% to 98.5% by mass of bitumen,
    b) from 0.5% to 6% by mass of one or more compounds of formula (I),
    c) from 0.5% to 6% by mass of one or more compounds of formula (II), and
    d) from 0.5% to 6% by mass of one or more compounds of formula (III),
    relative to the total mass of the bitumen pellets.

12. The bitumen pellets as claimed in claim 1, the pellets being covered on at least a portion of their surface with an anti-agglomerating agent.

13. The bitumen pellets as claimed in claim 12, wherein the anti-agglomerating agent is chosen from particulate anti-agglomerating agents, film-forming anti-agglomerating agents, and mixtures thereof.

14. The bitumen pellets as claimed in claim 1 which are a road binder.

15. A method for manufacturing bitumen pellets as claimed in claim 1, comprising at least the following steps:
    1) providing a bituminous composition comprising at least: bitumen, a compound of general formula (I), a compound of general formula (II) and a compound of formula (III),
    2) forming the bituminous composition into the form of pellets, and
    3) optionally, coating the pellets on all or part of their surface with at least one anti-agglomerating agent.

16. A method for manufacturing bituminous mixes comprising at least one road binder and aggregates or recycled bituminous mix aggregates, the road binder being in the form of bitumen pellets as claimed in claim 14, this method comprising at least the steps of:
    heating the aggregates to a temperature ranging from 100° C. to 180° C., mixing the aggregates with the road binder in a vessel, obtaining bituminous mixes.

17. The method as claimed in claim 16, which does not comprise a step of heating the road binder before it is mixed with the aggregates.

18. A method for transporting and/or storing and/or handling bitumen, wherein the method comprises
   a step consisting in the preparation of the bitumen in the form of bitumen pellets according to claim 1, and a step wherein the bitumen in the form of bitumen pellets is transported and/or stored and/or handled at ambient temperature.

\* \* \* \* \*